(12) United States Patent
Leukkunen et al.

(10) Patent No.: US 11,073,479 B2
(45) Date of Patent: Jul. 27, 2021

(54) APPARATUS AND METHOD FOR OPTICALLY DETECTING THE EMISSIONS OF A PLASMA PRODUCED IN A CONDUCTIVE LIQUID BY MEANS OF ELECTRODES WITH DIFFERENT AREAS IN CONTACT WITH THE LIQUID

(71) Applicant: OULUN YLIOPISTO, Oulu (FI)

(72) Inventors: Petri Leukkunen, Oulu (FI); Kalle Blomberg Von Der Geest, Oulu (FI); Ari Mäkinen, Oulu (FI)

(73) Assignee: OULUN YLIOPISTO, Oulu (FI)

( * ) Notice: Subject to any disclaimer, the term of this patent is extended or adjusted under 35 U.S.C. 154(b) by 380 days.

(21) Appl. No.: 16/063,119

(22) PCT Filed: Dec. 16, 2016

(86) PCT No.: PCT/FI2016/050887
§ 371 (c)(1),
(2) Date: Jun. 15, 2018

(87) PCT Pub. No.: WO2017/103341
PCT Pub. Date: Jun. 22, 2017

(65) Prior Publication Data
US 2020/0292458 A1 Sep. 17, 2020

(30) Foreign Application Priority Data
Dec. 17, 2015 (FI) ........................... 20155963

(51) Int. Cl.
*G01N 21/69* (2006.01)
*G01J 3/443* (2006.01)
*H05H 1/24* (2006.01)
(52) U.S. Cl.
CPC .............. *G01N 21/69* (2013.01); *G01J 3/443* (2013.01); *H05H 1/24* (2013.01)

(58) Field of Classification Search
CPC ............ G01N 21/69; G01J 3/443; H05H 1/24
(Continued)

(56) References Cited

U.S. PATENT DOCUMENTS

| 4,695,448 A | 9/1987 | Anthony |
| 5,807,467 A * | 9/1998 | Givens .................... C23C 14/34 204/192.12 |

(Continued)

FOREIGN PATENT DOCUMENTS

| EP | 0 468 110 A1 | 1/1992 |
| JP | 2007-207540 A | 8/2007 |

OTHER PUBLICATIONS

International Search Report for corresponding International Patent Application No. PCT/FI2016/050887 dated Aug. 14, 2017, 10 pages.
(Continued)

*Primary Examiner* — Tarifur R Chowdhury
*Assistant Examiner* — Omar H Nixon
(74) *Attorney, Agent, or Firm* — Merchant & Gould P.C.

(57) ABSTRACT

An apparatus comprises: a chamber (100) configured to be filled with electrically conductive liquid (102); a first electrode (104) and a second electrode (106) located within the chamber (100); an optical radiation receiver (126); and an electrically conductive contact area (108) of the first electrode (104) and an electrically conductive contact area (110) of the second electrode (106) are configured to be in contact with the liquid (102) of the chamber (100) wherein the electrically conductive contact area (108) of the first electrode (104) is configured to be smaller than the electrically conductive contact area (110) of the second electrode (106). The first electrode (104) and the second electrode (106) are configured to receive electric energy and output the electric energy to the liquid (102) in order to cause substance of the
(Continued)

liquid (102) to emit optical radiation at the electrically conductive contact area (108) of the first electrode (104) on the basis of densification of the electric energy due to the smaller electrically conductive contact area (108) of the first electrode (104). The optical radiation receiver (126) is configured to receive the optical radiation for analysis of the liquid (102).

8 Claims, 4 Drawing Sheets

(58) Field of Classification Search
USPC .......................................................... 356/311
See application file for complete search history.

(56) References Cited

U.S. PATENT DOCUMENTS

| | | | |
|---|---|---|---|
| 7,413,667 | B1 | 8/2008 | Routberg et al. |
| 2004/0022105 | A1* | 2/2004 | Ohsawa ............ H01L 27/10802 365/202 |
| 2007/0120523 | A1* | 5/2007 | Holmes .................. H02M 7/06 320/103 |
| 2007/0164206 | A1* | 7/2007 | Ishiuchi ................ H01J 49/162 250/282 |
| 2011/0248156 | A1* | 10/2011 | Komatsu ............. H01J 49/0463 250/251 |
| 2011/0266465 | A1* | 11/2011 | Shichi .................... H01J 37/15 250/492.3 |
| 2013/0196286 | A1 | 8/2013 | Rutberg et al. |
| 2014/0315237 | A1* | 10/2014 | Masujima .............. G01N 33/48 435/29 |
| 2014/0361155 | A1 | 12/2014 | Daito et al. |
| 2015/0009496 | A1 | 1/2015 | Kumagai et al. |
| 2015/0307370 | A1 | 10/2015 | Kang |

OTHER PUBLICATIONS

Finnish Search Report for corresponding Finnish Patent Application No. 20155963 dated Apr. 8, 2016, 1 page.

Anonymous: "GC 223 Impulse Generator Control Module", pp. 1-4 (2005): retrieved from the Internet: http://www.intyler-fimaco.com/gc223.pdf.
Bruggeman, P. et al., "Characterization of a direct dc-excited discharge in water by optical emission spectroscopy", Plasma Sources Science and Technology, 18(2): 1-13 (2009).
Bruggeman, P. et al., "Topical Review: Non-thermal plasmas in and in contact with liquids", J. Phys. D: Appl. Phys. 42: 1-28 (2009).
Grigorievich Rutberg, P. et al., "Electric Discharges and the Prolonged Microbial Resistance of Water", IEEE Transactions on Plasma Science, 35(4): 1111-1118 (2007).
Hamdan, A. et al., "Synthesis of platinum embedded in amorphous carbon by micro-gap discharge in heptane", Materials Chemistry and Physics, 142: 199-206 (2013).
Hamdan, A. et al., "Time-resolved imaging of nanosecond-pulsed micro-discharges in heptane", J. Phys. D: Appl. Phys., 47(5): 1-8 (2013).
Kurahashi, M. et al., "Radical formation due to discharge inside bubble in liquid", Journal of Electrostatics, 42: 93-105 (1997).
Liu, Q. et al., "Streamer Characteristic and Breakdown in Synthetic and Natural Ester Transformer Liquids under Standard Lightning Impulse Voltage", IEEE Transactions on Dielectrics and Electrical Insulation, 18(1): 285-294 (2011).
Nakamura, S. et al., "Optical Measurements of the Electric Field of Pulsed Streamer Discharge in Water", IEEE International Power Modulators and High Voltage Conference, 312-315 (2008).
Simek, M. et al., "Emission spectra of a pulse needle-to-plane corona-like discharge in conductive aqueous solutions", Plasma Sources Science and Technology, 21: 1-12 (2012).
Sun, B. et al., "Optical study of active species produced by a pulsed streamer corona discharge in water", Journal of Electrostatics, 39: 189-202 (1997).
Sun, B. et al., "Non-uniform pulse discharge-induced radical production in distilled water", Journal of Electrostatics, 43: 115-126 (1998).
Sunka, P. et al., "Generation of chemically active species by electrical discharges in water", Plasma Sources Science and Technology, 8(2): 258-265 (1999).

* cited by examiner

MEASUREMENT DATA
ABOUT IONIZED LIQUID

APPARATUS AND METHOD FOR OPTICALLY DETECTING THE EMISSIONS OF A PLASMA PRODUCED IN A CONDUCTIVE LIQUID BY MEANS OF ELECTRODES WITH DIFFERENT AREAS IN CONTACT WITH THE LIQUID

This application is a National Stage Application of PCT/FI2016/050887, filed 16 Dec. 2016, which claims benefit of Serial No. 20155963, filed 17 Dec. 2015 in Finland and which applications are incorporated herein by reference. To the extent appropriate, a claim of priority is made to each of the above disclosed applications.

FIELD

The invention relates to an apparatus for generating ionization, optical measurement apparatus and measurement method.

BACKGROUND

There is an increasing need to perform an analysis of elemental composition of a liquid in various fields. The analysis can be performed by converting the liquid into a plasma form, for example. A well-known analytical method is the inductively coupled plasma optical emission spectroscopy where the sample is sprayed into high temperature plasma which decomposes the sample molecules and excites the constituent atoms to higher energy states. When the atoms return to lower energy states they emit optical radiation which is specific to the elements and which can be analysed by using a spectrometer, for example. A tube or a tube-like measurement chamber which is made of an insulating material and which has a narrow portion with the cross-sectional area substantially smaller than elsewhere in the measurement chamber can be filled with electrically conductive liquid. On both sides of the narrow portion there are electrodes which have electrical contact to the electrically conducting liquid and to which a high enough voltage is applied. The voltage causes an electric current through the liquid and forms a gaseous bubble of the vaporized liquid in the narrow portion. The high voltage between the electrodes then causes electric discharge through the bubble which generates plasma in the bubble. The formation of a bubble is a prerequisite for the plasma generation. In the plasma the molecules are decomposed into atoms which excite to higher energy states. When the atoms return to lower energy states they emit optical radiation which is specific to the elements and which can be analysed by a spectrometer, for example.

This kind of analysing system has disadvantages. The narrow portion of the tube gathers dirt and solid particles which may block the liquid flow in the tube which, in turn, may prevent formation of vapor and generation of plasma. The generation of vaporized bubble and a separate discharge is complicated. Bubble dynamics is also hard to control, and liquid sample flow may be restricted. Also the location and/or dimensions and/or shape of the bubble often varies from bubble to bubble which causes error in measurements, also when narrowing is not used in the chamber. In case of thermal spark type discharge plasma, there may be excessive background noise leading to poor signal to noise ratio. Production of chamber may require expensive precision tooling. Errors result as poor sensitivity and/or poor precision. Prior art does not meet the sensitivity and precision requirements of industrial use in wide scale and especially online use. Thus, there is a need for improvement.

BRIEF DESCRIPTION

According to an aspect of the present invention, there is provided an apparatus for generating ionization.

The invention also relates to an optical measurement apparatus.

The invention also relates to a method.

Preferred embodiments of the invention are disclosed in the dependent claims.

The solutions according to the invention provide several advantages. The measurement chamber doesn't need to be designed to have a specific shape for the measurement. No separate gas generation or input is required for the measurement. The position of ionized bubbles is constant or well controlled.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments.

Furthermore, words "comprising" and "including" should be understood as not limiting the described embodiments to consist of only those features that have been mentioned and such embodiments may contain also features/structures that have not been specifically mentioned.

Figure 1:
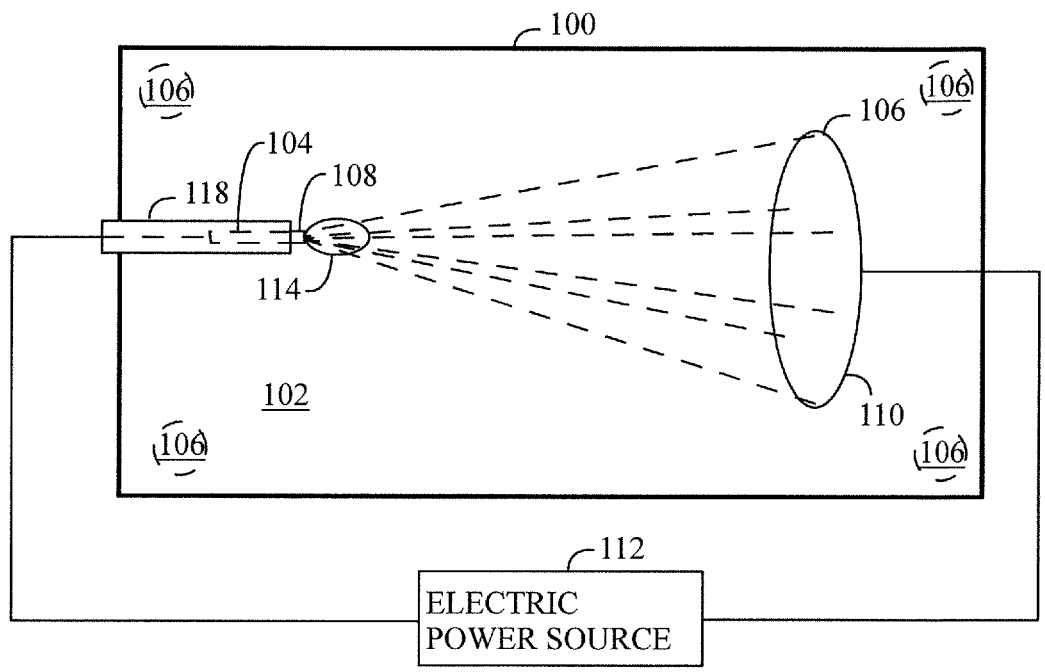
FIG. 1 illustrates an example of an apparatus generation ionization in electrically conducting liquid.

FIG. 1 illustrates an example an apparatus which comprises a chamber 100 which is filled with electrically conductive liquid 102. The chamber 100 may be a container which is filled and emptied or a tube or a tube-like cavity structure through which the liquid 102 may flow continuously or discontinuously. A first electrode 104 and a second electrode 106 at least partly are located within the chamber 100. An electrically conductive contact area 108 of the first electrode 104 and an electrically conductive contact area 110 of the second electrode 106 are in contact with the liquid 102 which is in the chamber 100. The electrically conductive contact area 108 of the first electrode 104 is smaller than the electrically conductive contact area 110 of the second electrode 106. The first electrode 104 and the second electrode 106 receive electric energy, which may be provided by an electric power source 112, and output the electric energy to the liquid 102 in order to cause substance of the liquid 102 to emit optical radiation at the electrically conductive contact area 108 of the first electrode 104. The emission of optical radiation is based on densification of the electric energy due to the smaller electrically conductive contact area 108 of the first electrode 104 with respect to the electrically conductive contact area 110 of the second electrode 106.

The electric energy of the first electrode 104 and the second electrode 106 may ionise the liquid 102 at the electrically conductive contact area 108 of the first electrode 104. The ionised portion 114 of the liquid 102 is formed on the basis of densification of the electric energy due to the smaller electrically conductive contact area 108 of the first electrode 104 with respect to the electrically conductive contact area 110 of the second electrode 106. The optical radiation receiver 126 (see FIG. 5) then receives the optical radiation for analysis of the liquid 102.

The ionised portion 114 which may be a bubble comprises ionised gas of the liquid 102. In this manner, a discharge through the liquid 102 between the whole length separating the electrodes 104, 106 may be avoided. Actually, the gas-like ionisation of the liquid may be generated without a discharge at all or a discharge may only take place locally at and/or near the first electrode 104 where the densification of the electric energy is high enough. The ionization by the electric energy excites the atoms in the ionized portion 114 to a higher energy state. The ionising portion may include multiple simultaneously existing bubbles.

In this manner, an asymmetric distribution of ionisation between the electrodes 104, 106 can be generated. Because the ionised portion 114 of the liquid 102 is always adjacent to the first electrode 104 and particularly to its electrically conducting area 108, the position of the ionised portion 114 of the liquid 102 is known. That facilitates the measurement of the optical radiation and improves the measurement results because the measurement can be made every time at the same position of the ionised portion 114 of the liquid 102.

The ionised portion 114 of the liquid 102 may comprise plasma. The densification of electric energy may refer to densification of electric current at and in adjacent to the electrically conductive contact area 108 of the first electrode 104. The electric current between the first electrode 104 and the second electrode 106 through the liquid 102 may be generated by voltage applied to the first electrode 104 and the second electrode 106 by the electric power source 112. The ionised portion 114 of the liquid 102 may be in contact with the electrically conductive contact area 108 of the first electrode 104.

The electric power source 112 may provide electric pulses the frequency of which may be in a range varying from few herzes to megaherzes, for example. In an embodiment, the frequency of pulses may be between 500 Hz to 10 kHz, for example. However, the operation of the apparatus is not limited to the frequency of the pulses. The duty-cycle of the pulses may be in a range 10%/90% to 90%/10%, for example. In an embodiment, the duty-cycle may be 50%/50%, for example. However, the operation of the apparatus is not limited to these duty-cycles.

In an embodiment, the electric power source 112 is adjustable. The adjustment can include adjustability of, current, frequency, duty cycle and voltage, for example. In an embodiment, the adjustments can be made dynamically.

Additionally, a dc-bias may be used in providing the electric pulses which increases the sensitivity in generation of the ionized liquid 114.

In an embodiment, electrically conductive contact area 108 of the first electrode 104 is controllable. In an embodiment, the first electrode 104 comprises or is made of tungsten or any other electrically conductive material which can well tolerate wearing conditions of the first electrode 104. The diameter of the electrically conductive area 108 of the first electrode 104 which is in use at a time may be in a range varying from micrometers to millimetres, for example. In an embodiment, the diameter may be 20 μm to 2000 μm, for example.

In an embodiment, the apparatus comprises an area meter 115 which may measure the electrically conductive contact area 108 of the first electrode 104. The area meter 115 may comprise a camera directed to the electrically conductive contact area 108 of the first electrode 104, and the camera may capture images of the electrically conductive contact area 108 of the first electrode 104. On the basis of image processing it is possible to determine the electrically conductive contact area 108 of the first electrode 104 which is in contact with the liquid 102 as a function of time.

Figure 2:
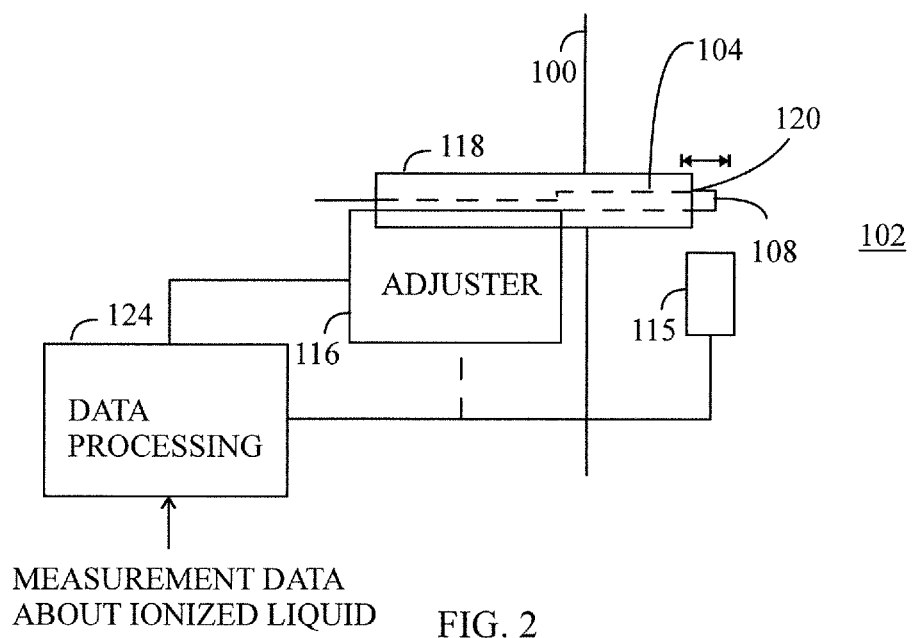
FIG. 2 illustrates an example of the first electrode and its adjustment in a position.

In FIG. 1, another possibility for the second electrode 106 is presented with dashed circles. The second electrode 106 may comprise a plurality of separate sub-electrodes which may be located in different locations in the chamber 100. Also in this embodiment, the electrically conductive contact area 108 of the first electrode 104 is smaller than the electrically conductive contact area 110 of the combined sub-electrodes of the second electrode 106. In an embodiment, the apparatus comprises an adjuster 116 which is illustrated in FIG. 2. The information about the electrically conductive contact area 108 of the first electrode 104 which is in contact with the liquid 102 may be fed directly (dashed line) or indirectly from the meter 114 to the adjuster 116. The adjuster 116 may adjust at least one of the following: the electrically conductive contact area 108 of the first electrode 104 and a location of the first electrode 104 inside the chamber 100. In an embodiment, the adjuster 116 may comprise a motor which moves the first electrode 104. The motor may be an electric motor. The first electrode 104 may be between two rolls which are compressed against the first electrode 104. However, the invention is not restricted to this solution.

In an embodiment, the second electrode is integrated to the wall of the chamber or to partially or fully form the actual chamber.

In an embodiment, the adjuster 116 may move the first electrode 104 within a cavity 122 (see FIG. 3) of an insulator 118 forward or back and forth. An end 120 of the cavity 122 of the insulator 118 is open for the electrically conductive contact area 108 of the first electrode 104 to extend outwards from the cavity in order to allow the liquid to touch the electrically conductive contact area 108 of the first electrode 104. The open end 120 may also let the liquid 102 to flow into the cavity 122 in order to allow the liquid to touch the electrically conductive contact area 108 of the first electrode 104.

Figure 3:
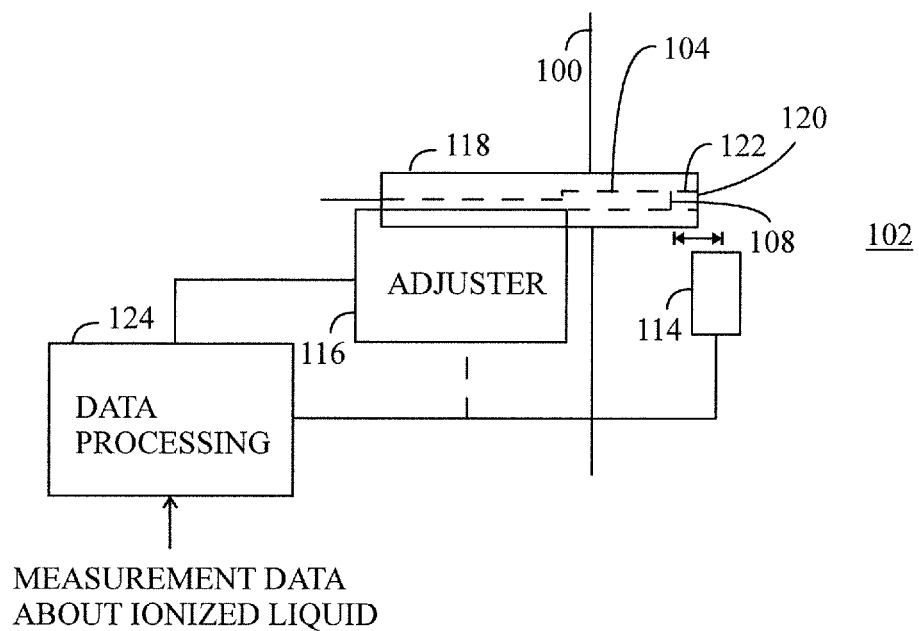
FIG. 3 illustrates an example of the first electrode and its adjustment in another position.

In an embodiment, the apparatus may comprise a data processing unit 124 which is shown in FIGS. 2 and 3. In this embodiment, the area meter 115 may be coupled to the signal processing unit 124 which may control the adjuster 116. The adjuster 116 may adjust, under the control of the signal processing unit 124, the electrically conductive contact area 108 of the first electrode 104 on the basis of at least one of the following: measurement data about electrically conductive contact area 108 of the first electrode 104 and measurement data about the ionised liquid 114.

Figure 4:
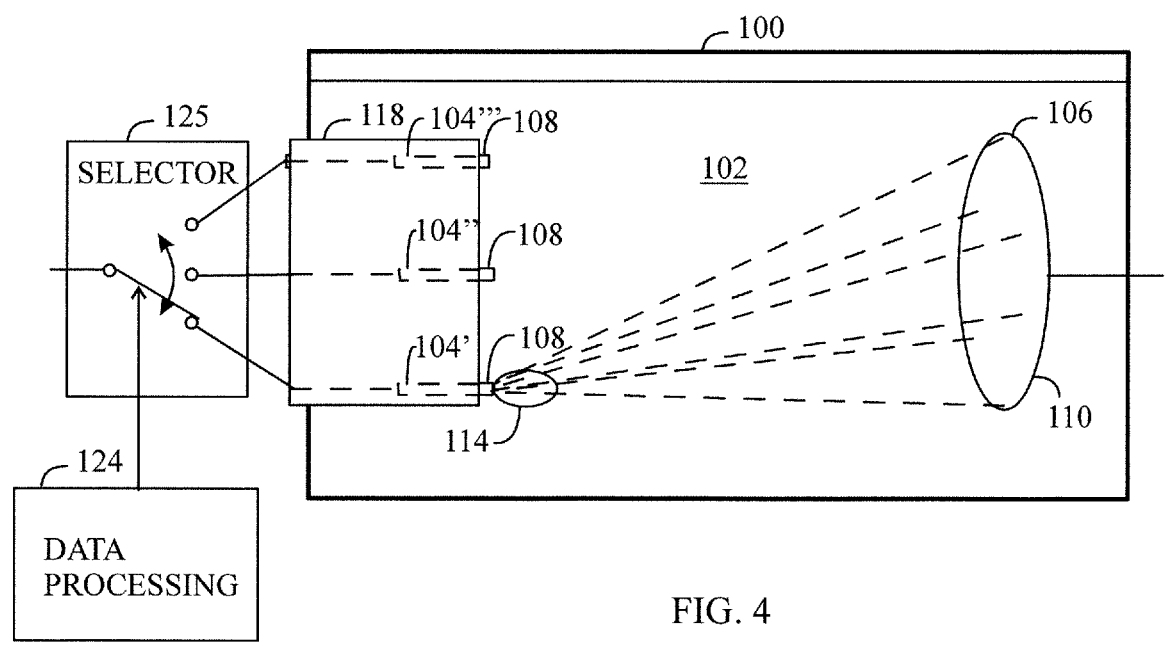
FIG. 4 illustrates an example of a selection of the first electrode.

In an embodiment which is illustrated in FIG. 4, apparatus may comprise a plurality of first selectable electrodes 104', 104", 104'". In an embodiment, only one of the selectable first electrodes 104', 104", 104'" is configured to be selected as the first electrode 104 to be in use at a time. In some other cases, more than one selectable electrode 104', 104", 104'" may be selected for the first electrode 104 to be used at a time. That a selectable electrode 104', 104", 104'" is selected and used means that electric energy is fed to it. Only one of the sub-electrodes 104', 104", 104'" may be in use for each electric pulse provided by the electric power source 112. A selectable first electrode may be selected for the first electrode 104 by a switch 125 which may be controlled by the data processing unit 124. When there are more than one selectable first electrodes 104', 104", 104'" to be used, the duration of all first selectable electrodes 104', 104", 104'" against wear is longer than that of only one first electrode 104 which is in use all the time.

Figure 5:
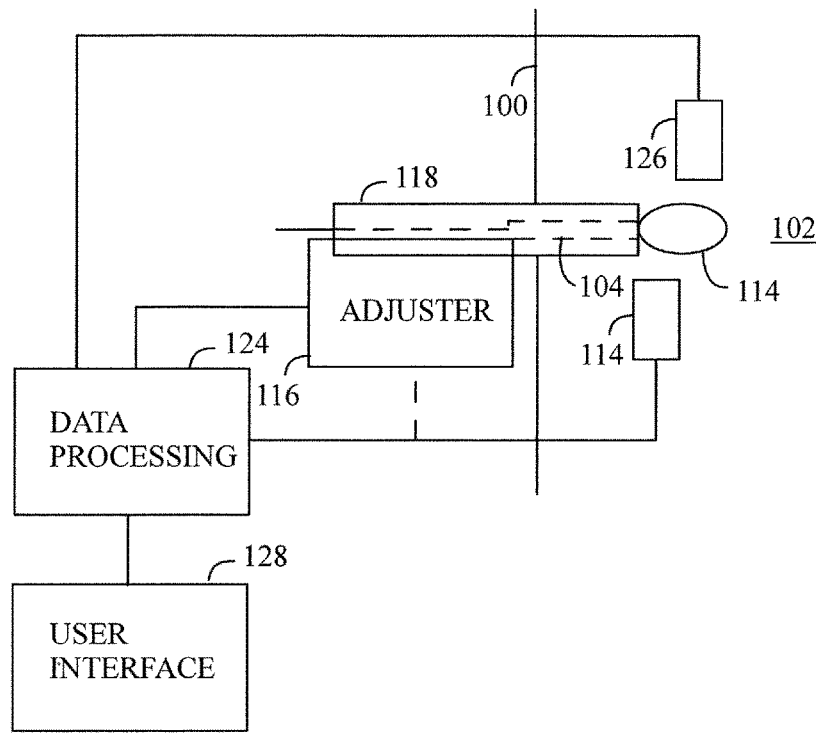
FIG. 5 illustrates an example of optical detection of the ionized portion of the liquid in the chamber.

In an embodiment illustrated in FIG. 5, the apparatus comprises an optical radiation receiver 126 which may receive optical radiation from the ionised portion 114 of the liquid 102. The optical radiation receiver 126 receives optical radiation when the electric pulse is applied through the electrodes 104, 106 to the liquid 102. In an embodiment, there is a plurality of optical radiation receivers 126 for gathering representative information about the optical radiation from the ionised portion 114 of the liquid 102. The optical radiation receiver 126 may feed data about the optical radiation to the data processing unit 124 which may control the adjuster 116 on the basis of this data. The data processing unit 124 may form data about the spectrum of the optical radiation received by the receiver 126. A user interface 128 which is coupled to the data processing unit 124 may comprise a screen and a key board. The screen may be a touch screen which has the key board or the key board may a separate device. The screen of the user interface may show the data about the spectrum to the user. Alternatively or additionally, elemental measurement may be performed by the data processing unit 124 on the basis of the spectrum and pre-saved information about spectrums of elements.

In an embodiment, the receiver 126 and the data processing unit 124 may act as a spectrum analyser.

Figure 6:
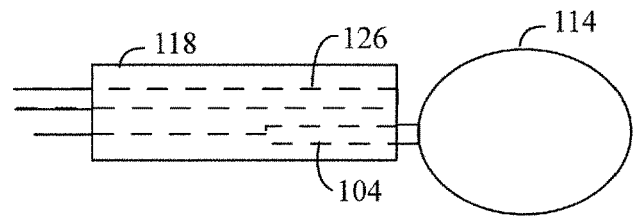
FIG. 6 illustrates an example of optical fiber as a receiver of optical radiation.

In an embodiment shown in FIG. 6, the receiver 126 may comprise one or more optical fibers beside or around the first electrode 104 or the first selectable electrodes 104', 104", 104'". The data processing unit 124 may transform the optical signal into an electric signal for processing. The electric signal may be transformed into a digital form. In an embodiment, the receiver 126 may also be used to monitor the electrically conductive area 108 of the first electrode 104 in which case a separate area meter 115 may not be needed. In such a case, the receiver 126 may form an image of the electrically conductive area 108 of the first electrode 104 which is then analysed by the data processing unit 124.

Figure 7:
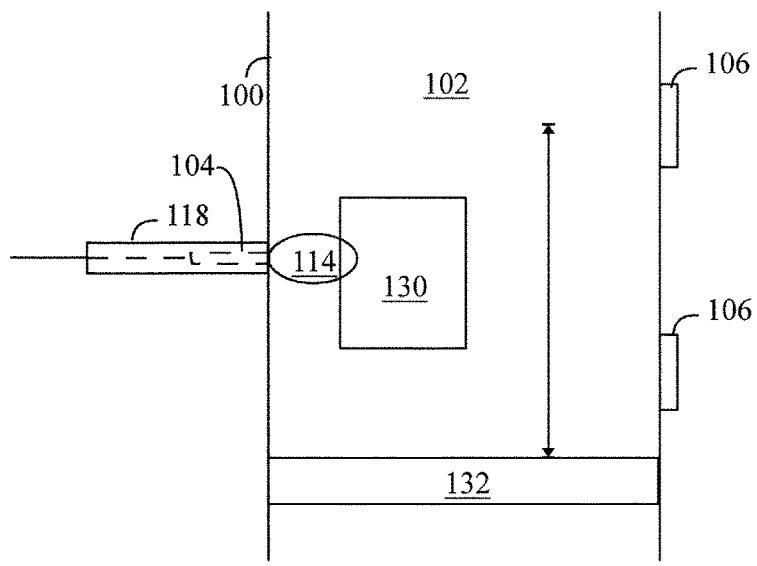
FIG. 7 illustrates an example of a tube-like chamber and its cleaning.
Figure 8:
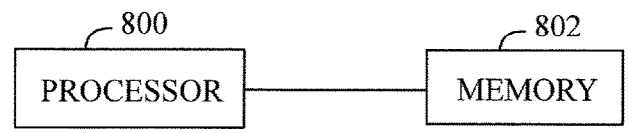
FIG. 8 illustrates an example of the data processing means.

FIG. 7 illustrates an example where the chamber 100 is a pipe for the liquid 102 to flow in. The pipe may be made of electrically non-conductive material such as plastic or glass, for example. The pipe may have a window 130 through which the receiver 126 may receive the optical radiation of the ionised liquid 114. The window 130 is designed to pass the optical band which is measured. In an embodiment, the pipe has a plurality of windows 130 which enables reception of optical radiation generated by the ionised liquid 114 from a plurality of directions. Information from a plurality of directions guarantees a better result than a measurement by one receiver 126 from only one direction.

The conductive contact area 108 of the first electrode 104 which is in contact with the liquid 102 may be at the same level as the inner contact of the pipe. If the contact area 108 of the first electrode 104 is worn, the first electrode 104 is moved forward such that the conductive contact area 108 of the first electrode 104 remains at the same level as the inner surface of the pipe. This prevents dirt to fix to the first electrode 104. FIG. 7 also illustrates an example where the second electrode 106 comprises a plurality of second sub-electrodes. All the second sub-electrodes may be in use during every electrical pulse provided by the electric power source 112. Alternatively, one or a part of the second sub-electrodes may be in use during every electrical pulse provided by the electric power source 112. Still, the electrical contact area 110 of the second electrode 106 is larger than that of the first electrode 104.

The inner surface of the pipe may be kept clean by a brush 132 or the like which moves back and forth in the pipe and which is in physical contact with the inner surface of the pipe. The inner surface of the pipe may additionally be cleaned with detergent, solvent, acid, alkali or the like.

An optical measurement device may comprise at least one processor 800 and at least one memory 802 including a computer program code. The at least one memory 802 and the computer program code are configured, with the at least one processor 800, to cause the measurement apparatus to perform the following operations. The supply of the electric energy to the first electrode 104 and the second electrode 106 is controlled. The reception of the ionised portion 114 of the liquid 102 made by the optical radiation receiver 126 is controlled with respect to the supply of the electric energy. The reception and/or detection is performed simultaneously with the electric pulses fed to the electrodes 104, 106. Spectrum measurement of the received optical radiation is performed. When the atoms return to lower energy states they emit optical radiation which is specific to the elements and which can be analysed spectrometrically. Data about the spectrum measurement is saved in the at least one memory 802 at least temporarily. At least a piece of the data about or derived from the spectrum measurement is presented in the user interface. Alternatively or additionally, elemental measurement may be performed by the data processing unit 124 on the basis of the spectrum and pre-saved information about spectrums of elements.

In an embodiment, measurement device may include capability for measuring the sample with additional modalities. As an example, but not limited to these, the additional modalities may include, absorption spectra, fluorescence, Raman spectra, conductivity, pH, temperature, inductance, capacity, permeability, permittivity or pressure. The additional modalities may be measured in an integrated measurement chamber 100 or in a separate chamber 100.

In an embodiment, the sample of liquid 102 may be dosed by pumping the sample to the chamber 100 using electric pump. The pump may be in a separate unit capable of selecting one or multiple sources of liquid samples. Source samples may include one or multiple standard solutions. The pump may pump to forward and reverse directions.

In an embodiment, measurement device may include capability for pre-treatment of the sample. As an example, but not limited to these, pre-treatment may include filtration, dissolving, concentration, heating, cooling, adding chemicals or reduction of components. Thus, the pre-treatment may be, for example, chemical, mechanical or biological. The pre-treatment may include a plurality of stages.

In an embodiment, measurement device may include capability for changing pressure, changing temperature of measurement chamber. The pressure change may be obtained by electric pump, for example. The temperature may be increased by electric heater, for example. The temperature may be decreased by thermoelectric cooler element, for example.

In an embodiment, measurement device may include capability for storing a library of known solutions for comparison and analysis purposes. The library may include information for well-functioning settings of the measurement device. In an embodiment, the library may be used to search for ideal measurement settings. Search may be done on the basis of initial measurement data or by pre-categorisation of the sample, for example.

In an embodiment, measurement device may include functionality to iteratively adjust the measurement settings for optimal measurement performance or to enable measuring specific analytes altogether.

In an embodiment, measurement device may include capability for dynamically changing any or all of the capabilities included in the overall setup.

In an embodiment, measurement device may include capability for providing signal for process control purposes. The signal may be current, voltage, optical or digital bus signal. The measurement device may include, for example, standards based or proprietary e.g. cable, wireless or optical networking interface for the purpose of providing the process control information. The measurement device may include multiple modules for process control.

In an embodiment, measurement device may be a part of measurement system which may include distributed components and functionality for collecting, analyzing the measurement data. A measurement device may be a single measurement node or there may be multiple measurement nodes. In an embodiment, the measurement device connects to a central server through private and/or public networks. System may include web server capable of wired or wireless communication. The measurement system may contain dedicated module or device to provide remote or local user interface to the operator. In an embodiment, the apparatus and the measurement system may be fully or partially modular solution, the modules may be high-voltage electronics, switching electronics, optics, fluidistics and data collection and processing unit, for example.

Figure 9:
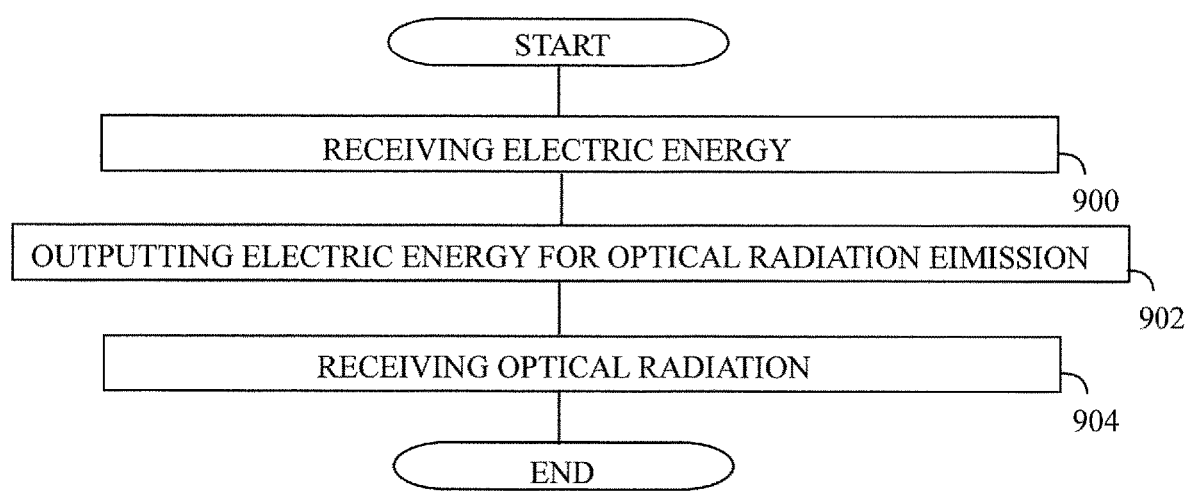
FIG. 9 illustrates an example of a flow chart of measurement method.

FIG. 9 illustrates an example of the measurement method. In step 900, electric energy is received by a first electrode 104 and a second electrode 106 located within a chamber 100 having electrically conductive liquid 102, an electrically conductive contact area 108 of the first electrode 104 and an electrically conductive contact area 110 of the second electrode 106 being in contact with the liquid 102 in the chamber 100 and the electrically conductive contact area 108 of the first electrode 104 being smaller than the electrically conductive contact area 110 of the second electrode 106. In step 902, outputting the electric energy to the liquid 102 for causing substance of the liquid 102 to emit optical radiation at an electrically conductive contact area 108 of the first electrode 104 on the basis of densification of the electric energy due to the smaller electrically conductive contact area 108 of the first electrode 104. In step 904, the optical radiation for analysis of the liquid 102 is received by the optical radiation receiver 126.

The method steps of FIG. 9 may be performed by a computer program performed using the data processing unit 124 comprising the at least one processor 800 and the at least one memory 802.

Instead of or in addition to using a processor and memory, the processing unit may be implemented as one or more integrated circuits, such as an application-specific integrated circuit ASIC. Other equipment embodiments are also feasible, such as a circuit constructed of separate logic devices. A hybrid of these different implementations is also possible.

The computer program may be placed on a computer program distribution means for the distribution thereof. The computer program distribution means is readable by means of a data processing unit 124, and it may encode the computer program commands to control the operation of the apparatus.

The distribution means, in turn, may be a solution known per se for distributing a computer program, for instance a computer-readable medium, a program storage medium, a computer-readable memory, a computer-readable software distribution package or a computer-readable compressed software package.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for generating ionisation, wherein the apparatus comprises:
   a chamber configured to be filled with electrically conductive liquid;
   a first electrode and a second electrode located within the chamber;
   an area meter configured to measure an electrically conductive contact area of the first electrode, the electrically conductive contact area of the first electrode being controllable for adjusting the electrically conductive contact area of the first electrode on the basis of the measured information about the electrically conductive contact area;
   an optical radiation receiver; and
   an electrically conductive contact area of the first electrode and an electrically conductive contact area of the second electrode are configured to be in contact with the liquid of the chamber wherein the electrically conductive contact area of the first electrode is configured to be smaller than the electrically conductive contact area of the second electrode; and
   the first electrode and the second electrode are configured to receive electric energy and output the electric energy to the liquid in order to cause substance of the liquid to emit optical radiation at the electrically conductive contact area of the first electrode on the basis of densification of the electric energy due to the smaller electrically conductive contact area of the first electrode; and
   the optical radiation receiver is configured to receive the optical radiation for analysis of the liquid.

2. The apparatus of claim 1, wherein the apparatus comprises an adjuster which is configured to adjust at least one of the following: the electrically conductive contact area of the first electrode and a location of the first electrode inside the chamber.

3. The apparatus of claim 2, wherein the adjuster is configured to move the first electrode within a cavity of an insulator, an end of the cavity of the insulator being open for the electrically conductive contact area of the first electrode to extend outwards from the cavity, or for the liquid to flow into the cavity in order to allow the liquid to touch the electrically conductive contact area of the first electrode.

4. The apparatus of claim 2, wherein the adjuster is configured to adjust the electrically conductive contact area of the first electrode on the basis of at least one of the following: measurement data about electrically conductive contact area of the first electrode and measurement data about the ionized portion of the liquid.

5. The apparatus of claim 1, wherein the apparatus comprises a plurality of selectable first electrodes, and only one of the selectable first electrodes is configured to be selected as the first electrode to be used at a time.

6. The apparatus of claim 1, wherein the apparatus is configured to form an ionized portion of the liquid with the electric energy.

7. An optical measurement apparatus, wherein the apparatus comprises:
   a chamber configured to be filled with electrically conductive liquid;
   a first electrode and a second electrode located within the chamber;
   an electrically conductive contact area of the first electrode and an electrically conductive contact area of the second electrode are configured to be in contact with the liquid of the chamber wherein the electrically conductive contact area of the first electrode is configured to be smaller than the electrically conductive contact area of the second electrode;
   an area meter configured to measure an electrically conductive contact area of the first electrode, the electrically conductive contact area of the first electrode being controllable for adjusting the electrically conductive contact area of the first electrode on the basis of the measured information about the electrically conductive contact area;
   an optical radiation receiver;
   a user interface; and
   the first electrode and the second electrode are configured to receive electric energy and output the electric energy to the liquid in order to cause substance of the liquid to emit optical radiation at the electrically conductive contact area of the first electrode on the basis of densification of the electric energy due to the smaller electrically conductive contact area of the first electrode;

the optical radiation receiver is configured to receive the optical radiation; and the measurement apparatus further comprises:
at least one processor and at least one memory including a non-transitory computer program code containing computer instructions stored therein for causing the at least one processor to perform, wherein the at least one memory and the non-transitory computer program code are configured, with the at least one processor, to cause the measurement apparatus at least to:
control the supply of the electric energy to the first electrode and the second electrode for the first electrode and the second electrode to be used;
control, with respect to the supply of the electric energy, the reception of the optical radiation made by the optical radiation receiver;
perform spectrum measurement of the received optical radiation;
save data about the spectrum measurement in the at least one memory at least temporarily; and
present at least a piece of the data about or derived from the spectrum measurement in the user interface.

8. A measurement method, the method comprising:
receiving electric energy by a first electrode and a second electrode located within a chamber having electrically conductive liquid, an electrically conductive contact area of the first electrode and an electrically conductive contact area of the second electrode being in contact with the liquid in the chamber and the electrically conductive contact area of the first electrode being smaller than the electrically conductive contact area of the second electrode;
measuring, by an area meter, an electrically conductive contact area of the first electrode, the electrically conductive contact area of the first electrode being controllable for adjusting the electrically conductive contact area of the first electrode on the basis of the measured information about the electrically conductive contact area;
outputting the electric energy to the liquid for causing substance of the liquid to emit optical radiation at an electrically conductive contact area of the first electrode on the basis of densification of the electric energy due to the smaller electrically conductive contact area of the first electrode; and
receiving, by the optical radiation receiver, the optical radiation for analysis of the liquid.

* * * * *